July 4, 1961 E. W. HAWKINSON 2,990,874
METHOD OF FORMING A TREAD ON A PNEUMATIC TIRE CASING
Filed Dec. 19, 1957 3 Sheets-Sheet 3
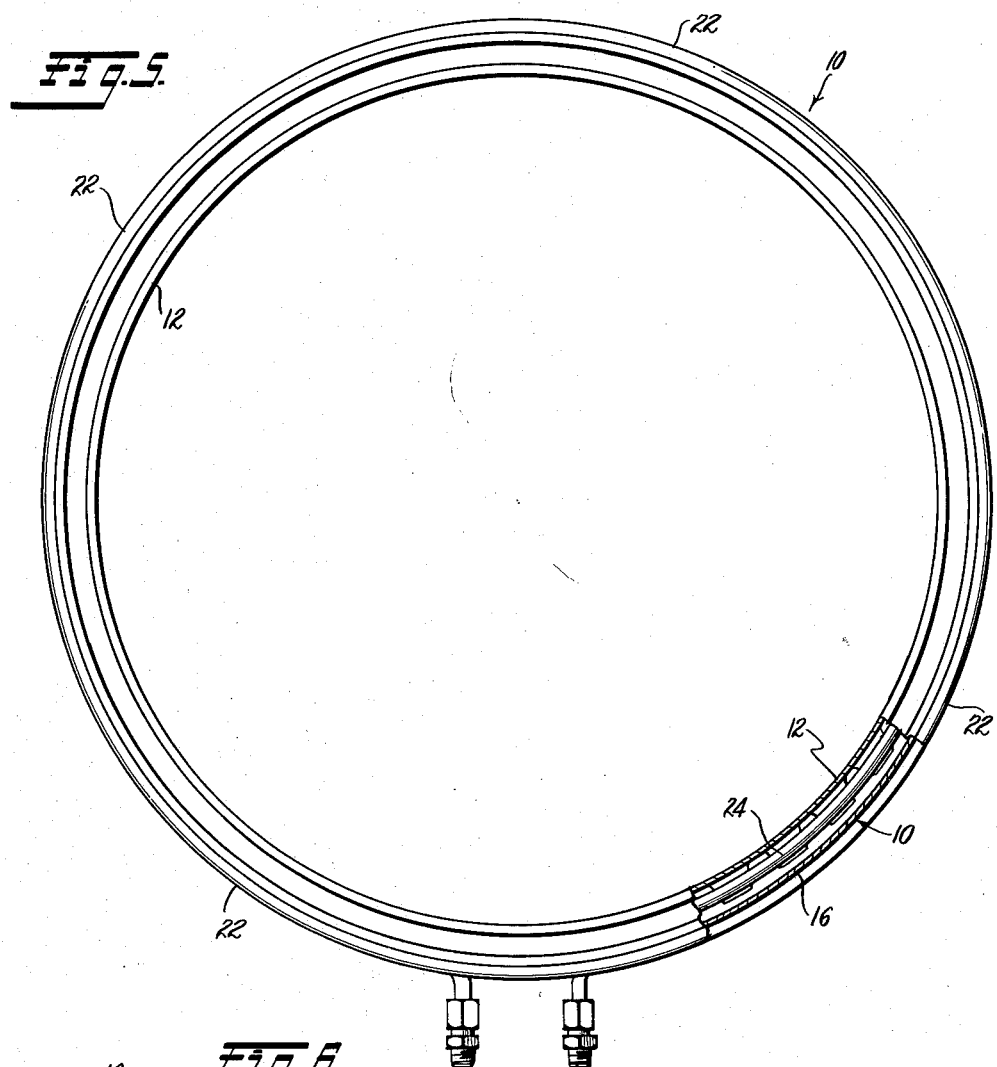
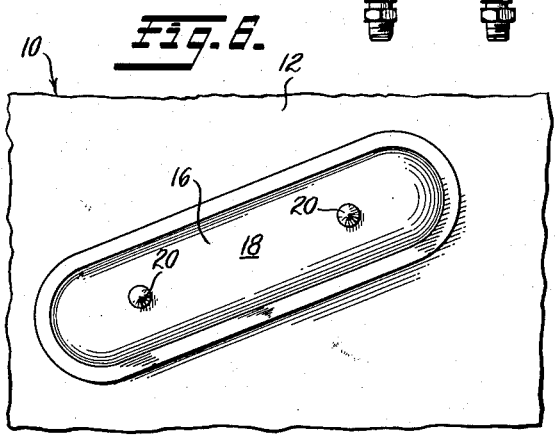
INVENTOR.
Earle W. Hawkinson
BY
Merchant & Merchant
ATTORNEYS

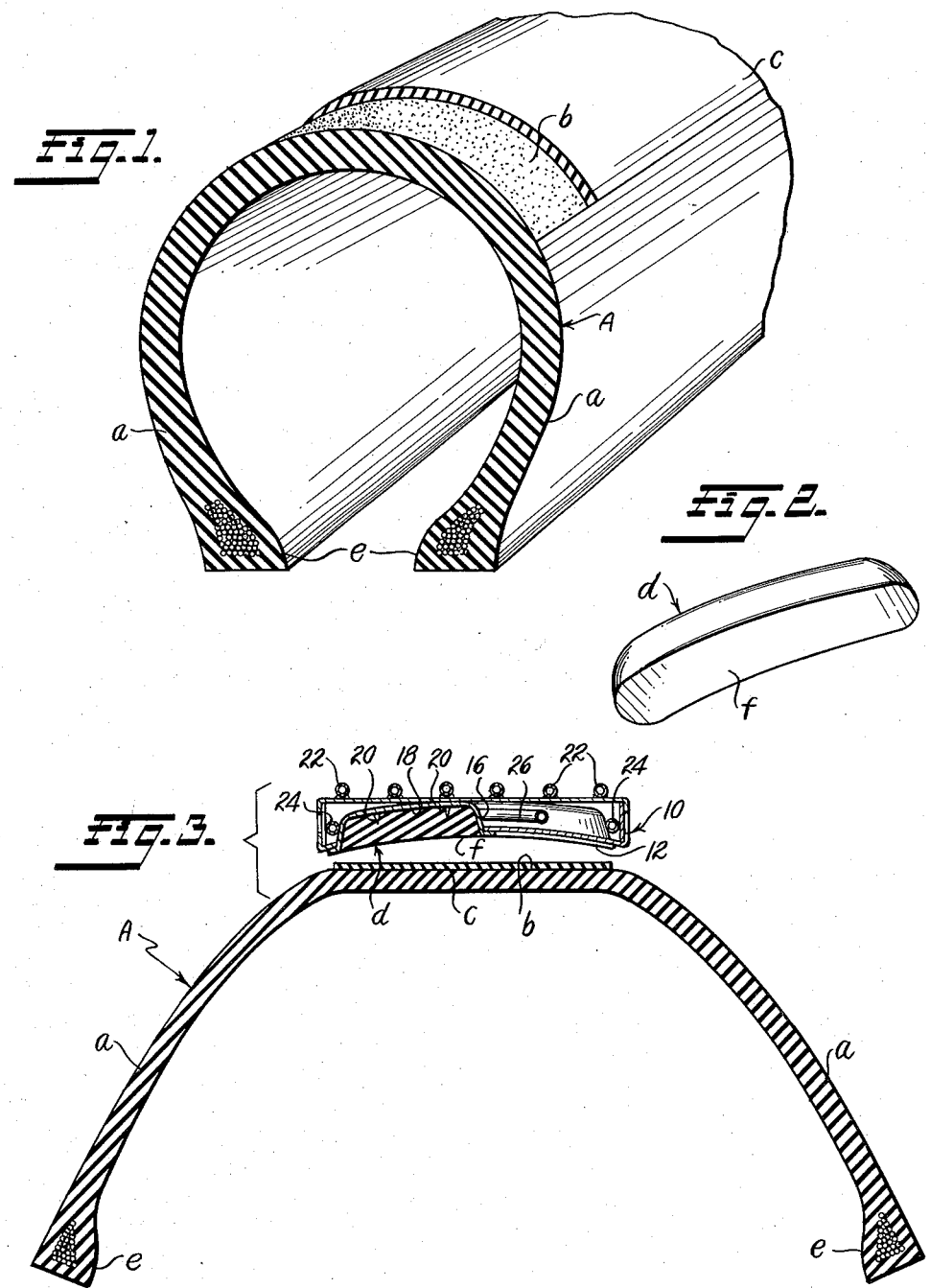

United States Patent Office 2,990,874
Patented July 4, 1961

2,990,874
METHOD OF FORMING A TREAD ON A PNEUMATIC TIRE CASING
Earle W. Hawkinson, Minneapolis, Minn., assignor to Paul E. Hawkinson Company, Minneapolis, Minn., a corporation of Minnesota
Filed Dec. 19, 1957, Ser. No. 703,847
2 Claims. (Cl. 154—14)

This invention relates in general to a method or process of forming the tread portion of a tire casing by applying tread material thereto, and deals principally with a method or process whereby a primary tread material is applied to the tire casing and a secondary tread material, separate from and independent of the primary tread material, is also applied to the tire casing.

A principal object of this invention is to form the tread portion of a tire casing from a plurality of separate, independent and individual tread forming portions.

It is an object of this invention to provide a method or process whereby a lug-type tread portion may be applied to a tire casing and wherein the raised lug portions of such tread are formed by individual elements of material bonded to the crown portion of the casing.

The primary object of this invention is to provide a novel method of applying a lug-type tread to a worn tire casing.

Another object of this invention is to provide a method whereby a lug-type tread may be applied to a worn tire casing by a novel method which causes a minimum amount of new rubber material to be used.

More specifically, an object of this invention is to provide a method of applying a lug-type tread to worn tire casings wherein the raised lug portions of the tread are formed from individual elements of new material bonded to the crown portion of the casing by a thin intermediate layer of new material which is independent of and separate from each of the individual lug elements, thus allowing most of the new material to be placed in the lugs where needed, while only a minimum amount of new material is placed in such a position as to serve no road-engaging function.

Still more specifically, an object of this invention is to provide a method of applying a lug-type tread to a worn tire casing by the Hawkinson-type retreading process, which includes the use of an endless annular mold which defines an unbroken band-like curing ring of less diameter than the diameter of the tire casing to be cured therein, whereby the tire casing may be placed thereinto and removed therefrom by the lateral axial spreading of the beads of the tire casing to reduce the circumference thereof.

Still more specifically, an object of this invention is to provide a method of the aforementioned character which includes the use of a mold of the type described in my copending application Serial Number 533,750, filed September 12, 1955, for Mold for Retreading Tractor Tires, now U.S. Patent No. 2,830,321, which mold is provided with an inner ring having a plurality of openings fitted with radially inwardly opening and radially outwardly extending cups adapted to retain and hold in place, during a portion of the tread forming operation, the individual elements of new material used to form the raised lug portions of the tread.

Other objects and advantages of this invention will become apparent during the course of the following description and by reference to the attached drawing, wherein:

FIG. 1 is a fragmentary perspective view of a tire casing illustrating one of the steps of the instant novel method;

FIG. 2 is a perspective view of one of the individual lug forming elements utilized in the practice of the instant novel method;

FIG. 3 is a sectional view of a tire casing showing the manner in which the same is entered into or removed from the retreading mold shown in FIGS. 4 and 5;

FIG. 5 is a side elevational view of the structure shown in FIG. 4, some of the parts being broken away and some being shown in section; and FIG. 6 is a view in top plan of one of the lug retaining and forming cups utilized in the structure of FIG. 4.

Figure 4:
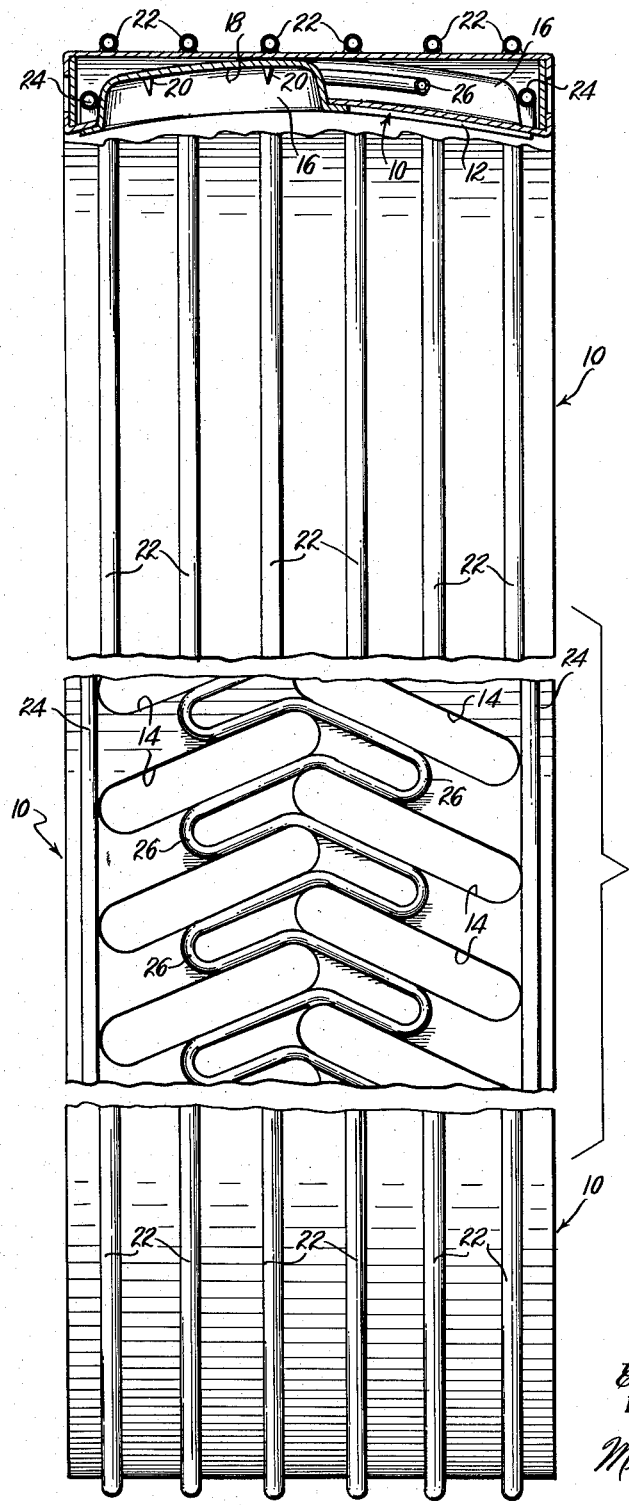
FIG. 4 is a view partly in vertical section and partly in front elevation of a retread mold suitable for use in practicing the present inventive method, some of the parts being broken away.

This application is a continuation-in-part of my copending application Serial No. 533,750, filed September 12, 1955, for Mold for Retreading Tractor Tires, now U.S. Patent No. 2,830,321, issued April 15, 1958.

Turning now to the drawing for a more detailed illustration of the instant novel method which forms the inventive concept of this application, attention is directed to FIG. 1, thereof, wherein there is illustrated a tire casing A, of the conventional pneumatic type as used on automobiles, trucks, tractors, and other similar vehicles.

The tire casing A is provided with axially spaced side walls *a*, a crown or tread portion *b*, and axially spaced bead portions *e*. The present novel method is directed toward the application and formation of a lug-type tread to the crown portion *b* of the tire casing A.

The first step in performing the method in accordance with the instant inventive concept, is to abrade or buff away part of the crown or tread portion *b* of the tire casing A so as to roughen the surface thereof and to true up such surface and to make this surface substantially smoothly curved, both axially and circumferentially if desired, throughout, with such surface being without any substantial surface depressions or other irregularities. Any conventional buffing apparatus may be used in the performance of this step, but for the best results it is preferable that a precision, or lathe type, buffer, such as shown in Patent 2,392,667, be employed.

After the crown portion *b* is roughened and trued a light coating of rubber cement may be applied, if desired, to the roughened surface. When this cement has been allowed to dry sufficiently, a primary tread material *c*; such as a thin strip or layer of uncured tread stock, is applied to the crown portion *b* throughout the circumference of the tire casing.

Next, a secondary tread material *d*, such as a plurality of individual elongated bar-like lug elements, as shown in FIG. 2, which are made of uncured tread rubber, and which are separate from and independent of the primary tread material *c*, the thin layer of uncured rubber, are applied to the crown portion, by placing the lug elements *d* in a desired position radially outwardly of the crown portion *b* and of the thin layer *c* of uncured rubber and the so disposed lug elements *d* are retained in this position, as will be more clearly stated hereafter. As will become apparent later, the lug elements *d*, the secondary tread material, form the raised radially outwardly protruding lug portions of the final tread surface which has been applied to the tire casing. It is therefore preferable that in placing and retaining the lug elements *d* in the desired position radially outwardly from said layer of uncured rubber *c* that the lug elements *d* are oriented in a regular pattern about the periphery of the tire casing so as to correspond to a desired final tread pattern of herringbone, or other typical lug-tread design.

In order to accomplish the step referred to above of placing and retaining the lug-elements *d* in a desired position in which the lug elements *d* are each separate from and independent of the layer of uncured rubber *c* it is considered preferable to employ a lug-retaining retreading mold such as shown in FIGS 4 to 6, inclusive, and which is more fully described and claimed in my copending application, Serial Number 533,750, filed September 12, 1955, for Mold for Retreading Tractor Tires, now U.S. Patent No. 2,830,321.

Referring to FIG. 4, it will be noted that the mold 10 includes a radially inner ring 12 provided with a plurality of elongated openings 14 grouped in two circumferential rows and regularly oriented to form a desired herringbone tread pattern. The openings 14 could, if desired, be arranged in any other desired pattern.

Each of the openings 14 positions and retains a radially inwardly opening, outwardly extending lug cup 16, such as illustrated in detail in FIG. 3. The bottom 18 of each of the cups 16 is provided with one or more pins 20 for piercing and holding the respective lug element d therein.

In using the mold 10, each of the cups 16 are filled with the secondary tread material, the lug-element d, which is mounted into and retained therein by the pins 20. After all the cups 16 are so filled the tire casing A and the mold 10 are brought together into concentric interfitting relationship, with the inner radial surface of the mold 10 being radially outwardly spaced from the crown portion b of the tire casing A. This relative positioning of the mold 10 and tire casing A may be facilitated by axially spreading apart the sidewalls a and the bead portions e, as shown in FIG. 3, to effect a reduction in the diameter of the crown portion b of the casing.

With the cups 16 filled and the mold 10 in place relative to the tire casing A, the primary tread material, the thin layer c of uncured tread rubber covering the crown portion b, is brought into firm engagement with the radially inward bottom surface f of the secondary tread material, lug elements d, by expanding the crown portion b radially outwardly by returning the sidewalls a and bead portions e from the axially spread position, as shown in FIG. 3, toward a normal position, as shown in FIG. 1, or it may be accomplished by applying air pressure to the inside of the casing A, or by a combination of these two steps or other steps known in the art. The essential step at this stage of the method or process is to bring the primary tread material, the layer c, and the secondary tread material, lug elements b, into firm engagement or contact with each other. Previous to this step in this method, the primary and secondary tread material have been entirely separate and independent of each other. After the layer c of uncured rubber and the lug elements d are placed in firm engagement with each other, heat is applied to the lug elements d, the layer of uncured rubber c and the crown portion b, as by steam supplied to the mold 10 through conduits 22, 24 and 26 connected to the mold for heat transfer therethrough. This application of heat causes the uncured rubber of the lug elements d and of the thin layer c to become cured, and in addition, effects a bonding together of these parts with each other and with the crown portion b of the tire casing A. The end result of the method disclosed above is a lug-type tread of cured rubber strongly secured to the tire casing A. After sufficient heat is supplied to effect a proper vulcanization curing and bonding of the tread materials to the tire casing, the tire casing may be removed from the mold by first contracting the crown portion an amount sufficient to draw the newly bonded lug-elements d from the cups 16. This may be done by once again spreading the casing sidewalls a and bead portions e to the position shown in FIG. 3.

The novel method above described has been thoroughly tested and found to be completely satisfactory for the accomplishment of the objects above set forth.

What I claim as my invention is:

1. The method of applying a plurality of elongated bar-like lug elements to a tread region of a worn tire casing having a crown portion, side walls and bead portions in a manner so that the bar-like lug elements are each disposed in upstanding relationship to the tread region of the tire casing, said method including the steps of abrading and truing up the road-engaging crown portion of the tire casing, applying a layer of uncured rubber material to the abraded crown portion, placing and maintaining a plurality of separate and independent elongated bar-like lug elements of uncured rubber material in radially outwardly spaced relationship to the layer of uncured rubber material with the bar-like lug elements each extending generally axially relative to the tire casing by removeably securing each of the bar-like lug elements to a tire mold, axially spreading apart the side walls and bead portions of the tire casing to reduce the diameter of the crown portion thereof, bringing said tire casing and said tire mold into interfitting concentric relationship, allowing the return of said side walls and the bead portions from said spread apart condition axially inwardly toward the normal position thereof to expand said crown portion radially outwardly and bring said layer of uncured rubber material into firm engagement with said bar-like lug elements, applying heat to said bar-like lug elements, said layer of uncured rubber material and said crown portion of said tire casing to effect a vulcanization of said uncured bar-like lug elements and said layer of uncured rubber material together and to effect a bonding thereof to said tire casing, and thereafter removing said tire casing having the bar-like lug elements secured to the crown portion thereof from said tire mold by axially spreading apart the side walls and the bead portions of said tire casing to reduce the diameter of the crown portion thereof.

2. The method of applying a plurality of elongated bar-like lug elements to the tread region of the tire casing as set forth in claim 1, wherein the bar-like lug elements are maintained in said tire mold by means of pins carried by the tire mold which pierce the respective bar-like lug elements.

References Cited in the file of this patent

UNITED STATES PATENTS

| | | |
|---|---|---|
| Re. 21,956 | Hawkinson | Nov. 25, 1941 |
| 2,121,956 | Egger | June 28, 1938 |
| 2,232,001 | Hawkinson | Feb. 18, 1941 |
| 2,297,354 | Hawkinson | Sept. 29, 1942 |
| 2,474,013 | Rawls | June 21, 1949 |
| 2,497,226 | McNeill | Feb. 14, 1950 |
| 2,497,774 | Hursh | Feb. 14, 1950 |
| 2,591,934 | Hawkinson | Apr. 8, 1952 |
| 2,625,199 | Glynn | Jan. 13, 1953 |
| 2,659,933 | Hawkinson | Nov. 24, 1953 |
| 2,662,245 | Hawkinson | Dec. 15, 1953 |
| 2,672,914 | Weigold et al. | Mar. 23, 1954 |
| 2,686,554 | Hinman | Aug. 17, 1954 |
| 2,697,472 | Hawkinson | Dec. 21, 1954 |

FOREIGN PATENTS

| | | |
|---|---|---|
| 555,680 | Great Britain | Sept. 2, 1943 |